United States Patent [19]
Tanaka et al.

[11] Patent Number: 6,157,685
[45] Date of Patent: Dec. 5, 2000

[54] INTERFERENCE CANCELLER EQUIPMENT AND INTERFERENCE CANCELLING METHOD FOR USE IN A MULTIBEAM-ANTENNA COMMUNICATION SYSTEM

[75] Inventors: Yoshinori Tanaka, Kawasaki; Shuji Kobayakawa, Yokohama; Hiroyuki Seki, Kawasaki; Takeshi Toda, Kawasaki; Masafumi Tsutsui, Kawasaki, all of Japan

[73] Assignee: Fujitsu Limited, Kawasaki, Japan

[21] Appl. No.: 08/995,253

[22] Filed: Dec. 19, 1997

[30] Foreign Application Priority Data

Dec. 20, 1996 [JP] Japan .................................. 8-340920

[51] Int. Cl.$^7$ .................................................. H04B 7/00
[52] U.S. Cl. ........................................... 375/346; 375/148
[58] Field of Search .................................... 375/346, 206, 375/140, 144, 148; 370/342; 455/296

[56] References Cited

U.S. PATENT DOCUMENTS

5,467,368  11/1995  Takeuchi et al. ..................... 375/206
5,757,791   5/1998  Kanterakis et al. ................... 370/342

*Primary Examiner*—Temesghen Ghebretinsae
*Assistant Examiner*—Kevin M. Burd
*Attorney, Agent, or Firm*—Helfgott & Karas, P.C.

[57] ABSTRACT

A multistage interference canceller equipment and interference canceller method for use, for example, in CDMA (Code Division Multiple Access) multibeam-antenna communication system includes in each stage an interference canceller unit which has a replica signal generator which generates from an input beam signal a first interference replica signal and outputs a first error signal, and an interference removal unit which receives from another replica signal generator a second interference replica signal, multiplies that second interference replica signal by conversion coefficients and subtracts an obtained signal from the first interference replica signal to produce a second error signal so that an error signal is generated for each signal beam from the interference replica signals of a local signal beam and other signal beams to eliminate interference.

14 Claims, 7 Drawing Sheets

INTERFERENCE CANCELLER EQUIPMENT AND INTERFERENCE CANCELLING METHOD FOR USE IN A MULTIBEAM-ANTENNA COMMUNICATION SYSTEM

BACKGROUND OF THE INVENTION

1. Field of the Invention

This invention pertains to the cancelling of interference in a Code Division Multiple Access (CDMA) multibeam-antenna communication system.

This invention also pertains to a Direct Sequence Code Division Multiple Access (DS-CDMA) digital mobile radio system.

2. Description of the Related Art

In a CDMA system, interference between user channels is the main factor that limits channel capacity and degrades transmission quality. Multibeam-antenna CDMA systems, now in the research and development stage, are also subject to beam-signal interference by beam overlapping.

Many types of interference cancellers have been proposed so far for the CDMA system to reduce interference from other user channels caused by the cross correlation of spread codes and to enhance the signal-to-interference ratio (SIR). The most promising interference canceller has several stages of generating an interference replica signal and subtracting it from a received signal.

Figure 1:
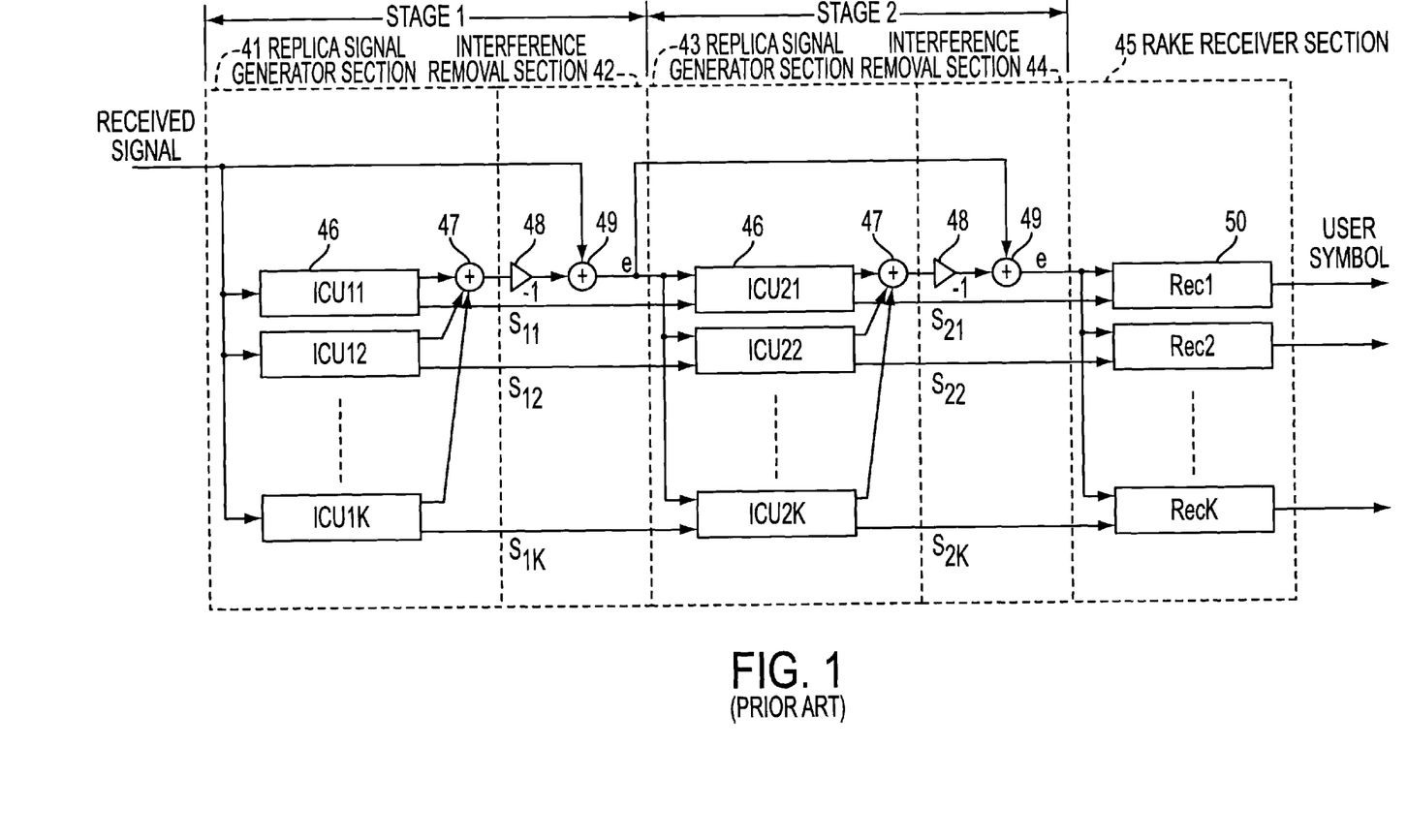
FIG. 1 shows a configuration of a two-stage interference canceller of the prior art.

FIG. 1 shows a two-stage interference canceller as an example of such multistage interference canceller. In FIG. 1, Stage 1 has a replica signal generator section (41) and an interference removal section (42), and Stage 2 also has a replica signal generator section (43) and an interference removal section (44). Each replica signal generator section (41, 43) consists of interference canceller units (46) (ICU$_{11}$ to ICU$_{1K}$, ICU$_{21}$ to ICU$_{2K}$) and an adder (47). Each interference removal section (42, 44) consists of a polarity inverter (48) and an adder (49). The removal section receives an interference replica signal from the polarity inverter (48) and adds it to the received signal. A RAKE receiver (45) consists of user receivers (50) (Rec1 to RecK).

Figure 2:
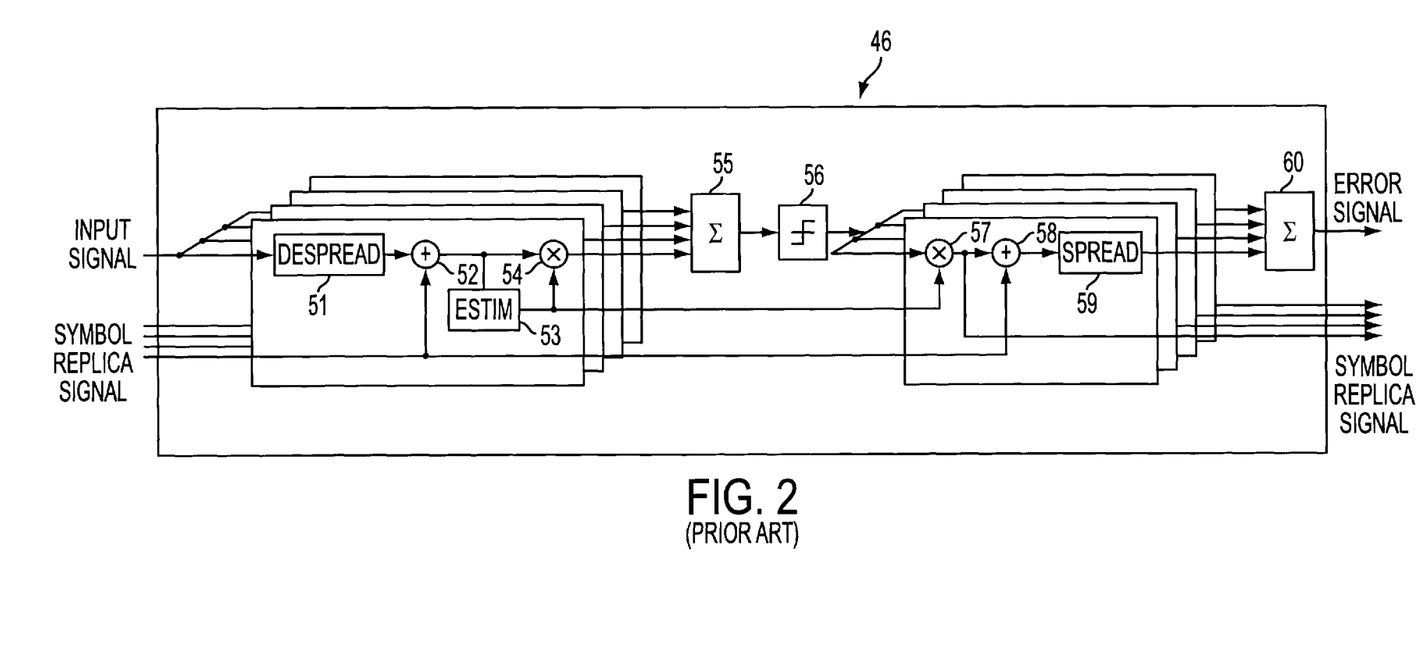
FIG. 2 shows a detailed configuration of an interference canceller unit (ICU) shown in FIG. 1.

The interference canceller unit (46) has the configuration shown in FIG. 2. This figure shows an example of a four-finger configuration. The finger section of the preceding stage consists of despreaders (51), adders (52), channel estimation units (53), and multipliers (54). The finger section of the next stage consists of multipliers (57), adders (58), and spreaders (59) which carry out spread modulation of the signals. The interference canceller unit also contains combiners (55, 60) and a decision unit (56) coupled to combiner (55).

A received signal or a signal from the preceding stage is input to the despreader (51) in the finger section of the preceding stage corresponding to the delay profile. The spreader demodulates the input signal using a spread code, and the adder (52) adds the signal to a symbol replica signal received from the preceding stage. The channel estimation unit (53) estimates a channel parameter from the added output signal. The multiplier (54) multiplies the complex conjugate of the estimated channel parameter by the output signal from the adder (52). The combiner (55) synthesizes output signals from each multiplier (54) in the finger section of the preceding stage by RAKE synthesis.

After quantization of the synthesized signal by the decision unit (56), the quantized decision signal is input to the finger section of the next stage.

A decision signal from the decision unit (56) is input to the multiplier (57) of the finger section of the next stage. The multiplier (57) multiplies the decision signal by the estimated channel parameter from the channel estimation unit (53). The multiplied output signal is transferred to the interference canceller unit of the next stage as a symbol replica signal. The adder (58) subtracts the symbol replica signal and inputs the signal to the spreader (59). After spread modulation, the signal is input to the combiner (60), where the signal becomes an error signal.

In FIG. 1, the Stage 1 replica signal generator section (41) adds up error signals from the user interference canceller units (46) (ICU$_{11}$ to ICU$_{1K}$). The symbol replica signals S$_{11}$ to S$_{1K}$ are input to the interference canceller units (46) (ICU$_{21}$ to ICU$_{2K}$) of the Stage 2 replica signal generator section (43).

The Stage 1 interference removal section (42) inverts the polarity of an output signal from the adder (47) with the polarity inverter (48). The adder (49) adds the signal to the received signal and generates output error signal e. The error signal is input to the Stage 2 canceller units (46) (ICU$_{21}$ to ICU$_{21}$).

The Stage 2 replica signal generator section (43) outputs symbol replica signals and error signals from the interference canceller units (46) (ICU$_{21}$ to ICU$_{2K}$). The adder (47) adds the error signals and inputs error signal e to the interference removal section (44). After polarity inversion by the polarity inverter (48), the adder (49) adds the error signal to the one from Stage 1 to produce a new error signal e.

This error signal e and the symbol replica signals S$_{21}$ to S$_{2K}$ are input to the user receivers (50) Rec1 to RecK in the RAKE receiver (45) to regenerate a user symbol. This allows a signal to be received without interference between user channels.

Figure 3:
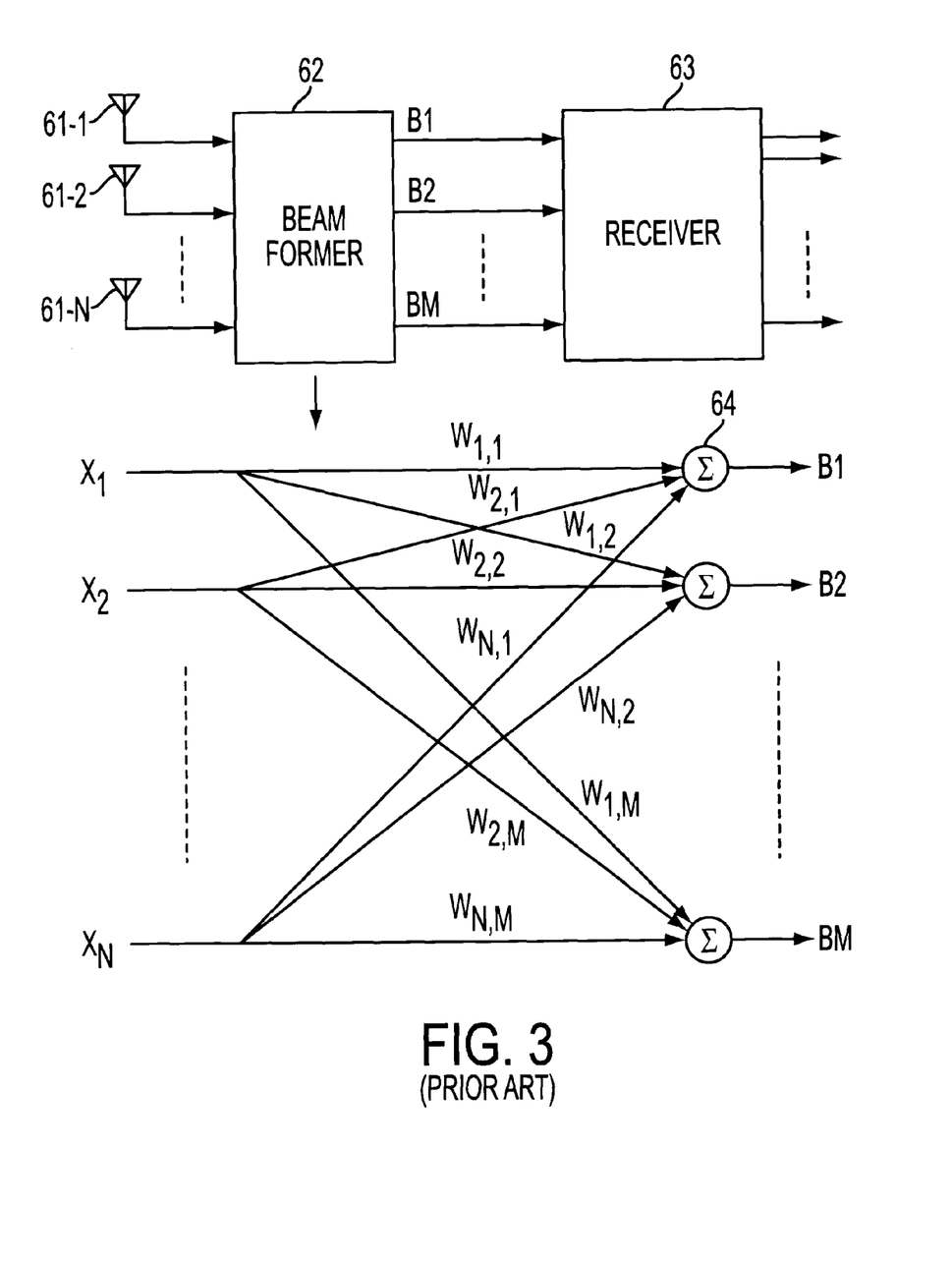
FIG. 3 shows a configuration of a multibeam-antenna system of the prior art.

FIG. 3 shows a multibeam-antenna system which contains several antennas (61-1 to 61-N), a beam former (62), and a receiver (63). FIG. 3 shows the main part of a multibeam-antenna system applied to a base station for CDMA communications system. The beam former (62) has the configuration outlined below. Signals received by the antennas (61-1 to 61-N) are amplified, detected, and converted from analog into digital (X$_1$ to X$_N$).

The N signals from X$_1$ to X$_W$ are multiplied by the conversion coefficients from W$_{1,1}$ to W$_{N,M}$. An adder (64) then adds the signals to the M beam signals (B1 to BM). In other words, the beam former (62) converts the N signals received by the N antennas (61-1 to 61-N) to M beam signals.

Figure 4:
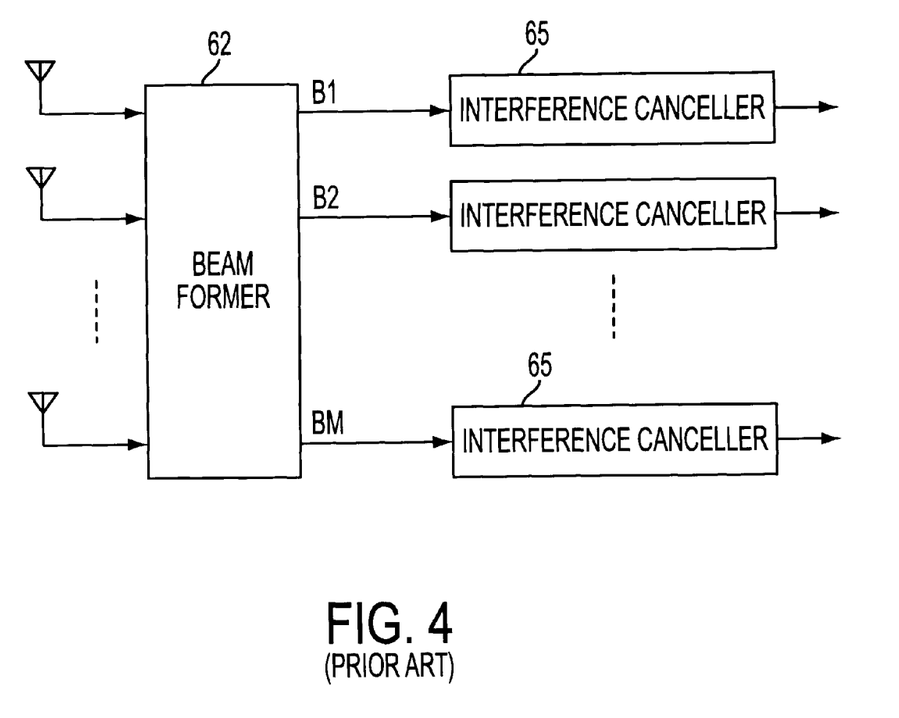
FIG. 4 shows a configuration of the system shown in FIG. 3 when an interference canceller is used.

FIG. 4 shows a system configuration in which the interference canceller is applied to a multibeam-antenna CDMA system. Interference cancellers (65) are prepared for beam signals B1 to BM outputted from the beam former (62) to cancel interference between user channels for each beam. The symbol replica and error signals from the interference cancellers are input to the receiver section, which is not illustrated here. The receiver section regenerates user data by RAKE combining and sends the data to the network.

As mentioned above, preparing a multistage interference canceller for each beam eliminates interference between users even in a multibeam-antenna CDMA system. If multiple beam antennas are used, however, beams partially overlap each other. This overlapping generates interference between signals and degrades the reception characteristic. Even a multistage interference canceller cannot eliminate interference between beam signals. To eliminate this kind of interference, we need an extra mechanism, but adding it will increase circuit scale and cost.

SUMMARY OF THE INVENTION

It is an object of the present invention to provide an interference canceller that cancels interference not only between user channels within one beam but also between beam signals.

Yet another object of this invention is to provide an interference canceller that cancels interference between beam signals without increasing circuit scale.

To attain these and other objects, this invention generates an error signal for each beam from the interference replica signals of not only the beam but also of other beams in a multistage interference canceller that has an interference canceller unit for each beam.

DETAILED DESCRIPTION OF THE PREFERRED EMBODIMENT

Figure 5:
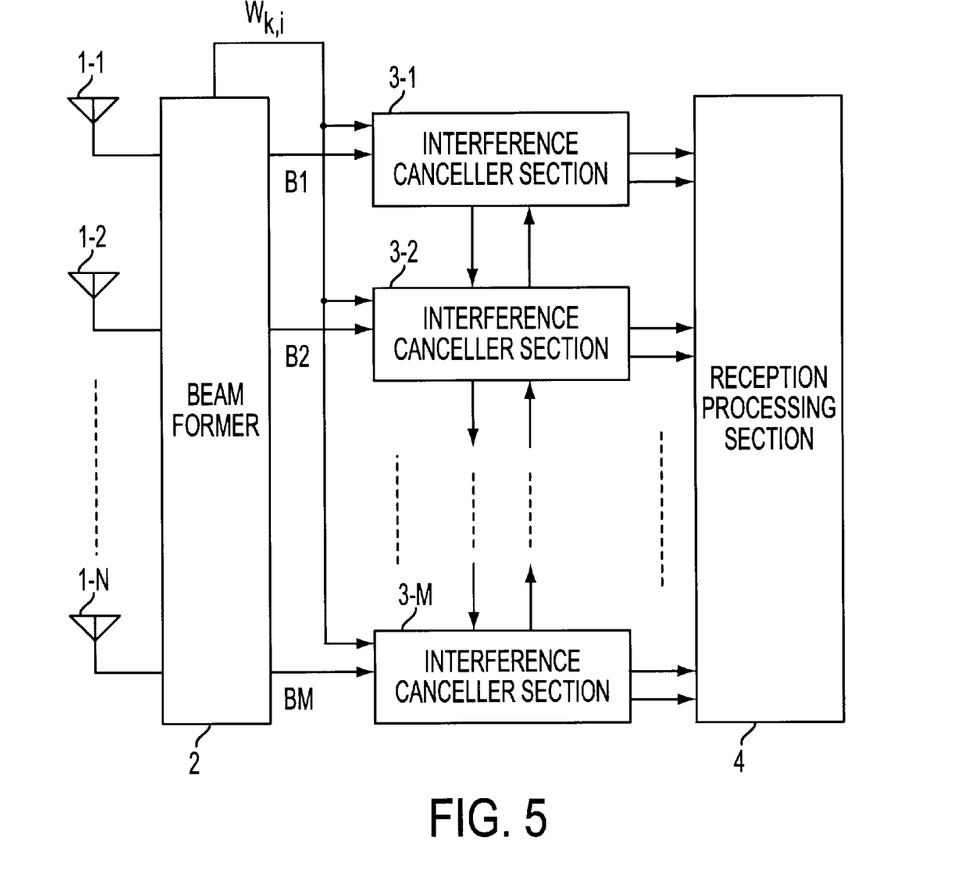
FIG. 5 shows an outline of the system based on the present invention.

FIG. 5 shows an outline of the system based on the present invention. In FIG. 5, a beam former (2) is provided to convert the signals received by N antennas (1-1 to 1-N) into M beam signals (B1 to BM) and input the beam signals to interference cancellers (3-1 to 3-M). The receiver section (4) executes RAKE processing.

As processed by an ordinary high-frequency signal receiver, signals received by the antennas (1-1 to 1-N) are amplified, detected, and converted from analog to digital. The beam former (2) converts the digital signals to M beam signals (B1 to BM) by adding the signals using the corresponding conversion factors. The M beam signals are input to the interference cancellers (3-1 to 3-M) as signals synchronous with the spread codes for despread processing in the cancellers.

If the sampling interval is Tc, the sampling time is n, the signals received at the N antennas (1-1 to 1-N) are $x_i$ (nTc), and the conversion coefficients in the beam former (2) are $W_{ki}$ where i=1 to M and k=1 to N, the beam signal $y_i$ (nTc) can be expressed as follows:

$$y_i(nT_c) = \sum_{k=1}^{N} (Wk, i) \cdot xk(nT_c) \quad (1)$$

$$\sum_{k=1}^{N}$$

indicates the summation from k=1 to N.

The interference cancellers (3-1 to 3-M) remove interference from each beam signal $y_i$ (nT). Each canceller 25 has a single-stage configuration or a multistage vertical configuration, each of which consists of a replica signal generator and an interference removal section. The canceller generates an interference replica signal $r_i$(nT) by reverse spread using a spread code, user channel estimation, RAKE synthesis, decision, and re-spread using a spread code. By subtracting the interference replica signal $r_i$(nT) from the beam signal yi (nTc), the canceller eliminates interference between users. These operations are described in connection with FIG. 2.

Each interference canceller (3-1 to 3-M) in this invention obtains an interference replica signal for another beam from the local beam error signal, obtains a signal by multiplying the replica signal by the conversion coefficients (Gj, i) and subtracts the obtained signal from the other beam signal yi (nT). This eliminates from the beam the interference by the other beam.

The receiver section (4) can take any known configuration form. This section improves the reception characteristic by executing RAKE processing on the symbol replica signals from the interference cancellers (3-1 to 3-M) and remaining error signals.

Figure 6:
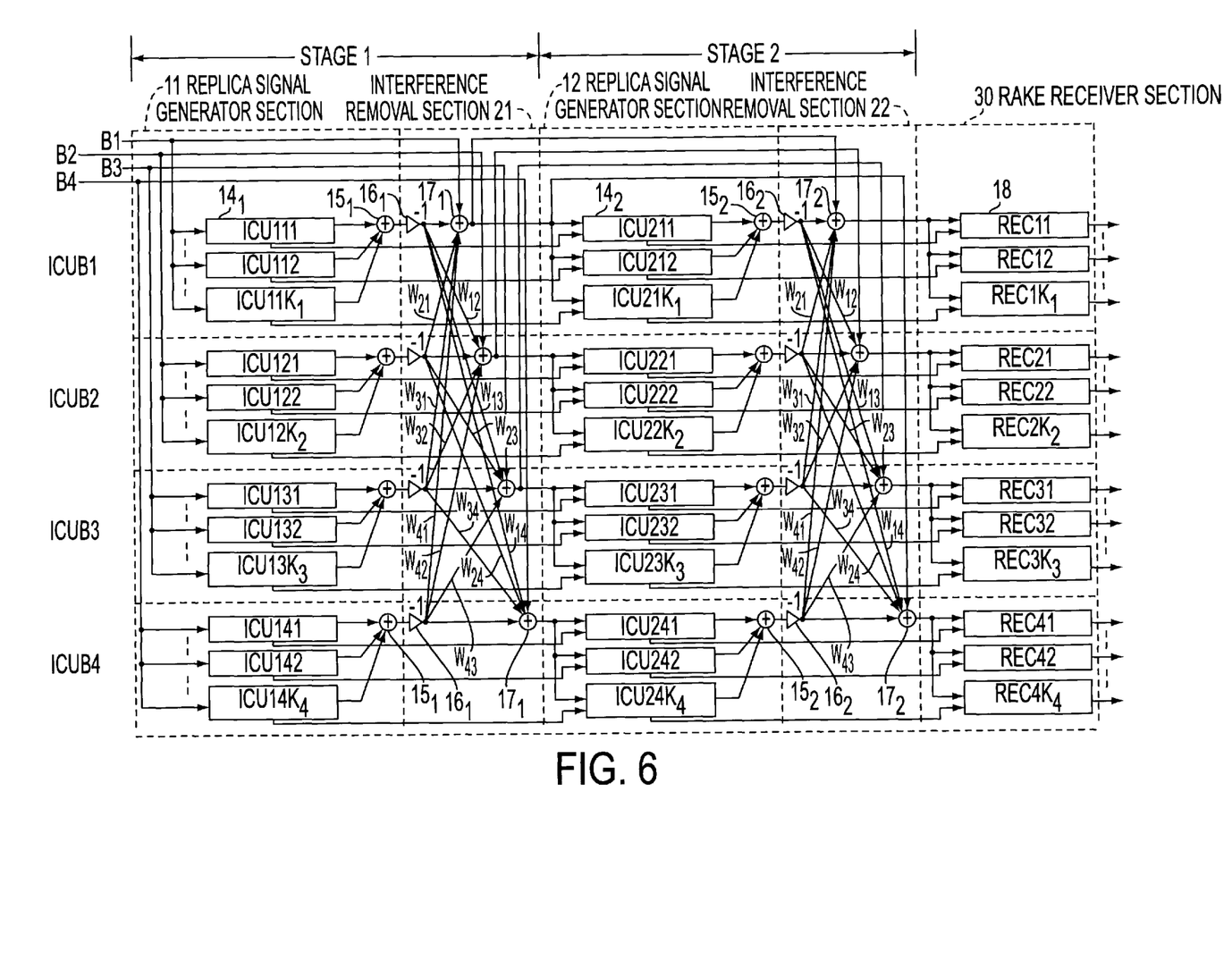
FIG. 6 shows a detailed configuration of the interference canceller and receiver section of the system of FIG. 5.

FIG. 6 shows a detailed configuration of the interference canceller and the receiver section shown in FIG. 5. FIG. 6 shows a two-stage interference canceller for four beam signals from B1 to B4. The number of stages can be changed on request, allowing this invention to be applied easily.

The interference canceller shown in FIG. 6 consists of replica signal generators (11, 12) and interference removal sections (21, 22) in two stages, a RAKE receiver section (30), interference canceller units (14₁ and 14₂) (ICU111 to ICU14K4, ICU211 to ICU24K4), multi-input adders (15₁, 15₂, 17₁, 17₂), polarity inverters (16₁, 16₂), receiver sections (REC1 to RECIK), and interference canceller blocks (ICUB1 to ICUB4) for beam signals B1 to B4. G12 to G43 (excluding G22 and G33) indicate conversion factors for multiplication with the corresponding signals. The conversion coefficients are the same as those for the above mentioned beam former.

Hereafter, the interference canceller units are referred to as ICU111 to ICU14K4 and ICU211 to ICU24K4 individually or as 14₁ and 14₂ generically. In the replica signal generators (11, 12), delay circuits can be installed to compensate for process delays for beam signals B1 to B4 in 14₁ and 14₂. FIG. 6 shows the application of a two-stage interference canceller to four beam signals. Stage 1 consists of a replica signal generator section (11) and an interference removal section (21) and Stage 2 consists of a replica signal generator section (12) and an interference removal section (22). The canceller uses interference canceller sections (ICUB1 to ICUB4) for beam signals B1 to B4. More stages can be connected vertically to create a multistage configuration, and the number of beam signals can be increased.

The replica signal generators (11, 12) of interference canceller section ICUB1 for beam signal B1 are equipped with interference canceller units (ICU111 to ICU11K1, ICU211 to ICU21K1) for users 1 to K1. The replica signal generators (11, 12) of ICUB2 for B2 are equipped with ICU121 to ICU12K2 and ICU221 to ICU22₂ for users 1 to K2.

The replica signal generators (11, 12) of interference canceller section ICUB3 for beam signal B3 are equipped with interference canceller units (ICU131 to ICU13K3, ICU231 to ICU23K3) for users 1 to K3. The replica signal generators (11, 12) of ICUB4 for B4 are equipped with ICU141 to ICU14K2 and ICU241 to ICU24K4 for users 1 to K4.

As FIG. 2 shows, each interference canceller unit (14₁, 14₂) has a mechanism for outputting symbol replica and error signals. The beam signals B1 to B4 are represented by equation (1). For the four beam signals, "i" in the expression is 1 to 4.

The interference removal sections (21, 22) are equipped with polarity inverters (16₁, 16₂) and adders (17₁, 17₂) and output error signals from the adders.

The error signals from the interference canceller units (14₁) of the Stage 1 replica signal generator section (11) are added by the adder (15₁). After polarity inversion by the polarity inverter (16₁) in the interference removal section (21), the added signal is input to the adder (17₁) for the local beam and those for other beams as an interference replica signal. The interference replica signal corresponding to the local and other beam signals is multiplied by the conversion coefficients (Gji). Next, the multiplied signal is subtracted from a beam signal to output an error signal. Since the error signal is input to the adder (17₁) with a beam signal after polarity inversion, a polarity-inverted interference replica signal is subtracted from the beam signal.

For example, the interference replica signal rj, i (nT) from the j-th beam signal to the i-th beam signal yi (nT) can be expressed as follows:

$$r_{j,i}(nT_c) = \sum_{k=1}^{N} W_{k,j} \cdot W_{*k,i} \cdot r_j(nT_c) \quad (2)$$

* in "wk, i*" represents a complex conjugate. By subtracting the interference replica signal rj,i (nTc) from the i-th beam signal yi (nT), interference between the beam signals can be removed. In this case, the error signal ei (nT) can be expressed as follows:

$$e_{i,}(nT) = y_i(nT_c) - r_i(nT_c) - \sum_{\substack{j=1 \\ j \neq 1}}^{M} r_{j,i}(nT_c) \quad (3)$$

Like the error signal ei (nT) in equation (3) above, an interference-free beam signal can be obtained.

The system also executes processing similar to Stage 1 in stage 2. Error signals from the interference canceller units (14₂) corresponding to each user are added by the adder (15₂). The polarity inversion unit (16₂) inverts the signal polarity to produce an interference replica signal. The interference replica signals from the local and other beam signals are input to the adder (17₂) and subtracted from the beam signal to output an error signal without any interference between users or beam signals.

The receiver section (18) corresponding to each user in the receiver section (30) is configured for RAKE reception. This section receives error signals from the Stage 2 adders (17₂) and symbol replica signals from the interference canceller units (14₂) and outputs user symbols by RAKE processing or other known means.

Therefore, interference canceller sections ICUB1 to ICUB4 for beam signals B1 to B4 allow mutual signal transfer between the interference removal sections (21, 22) and adders (17₁, 17₂) without special circuit components. By subtracting the added interference replica signal from a beam signal, interference between the beam signals can be eliminated.

Figure 7:
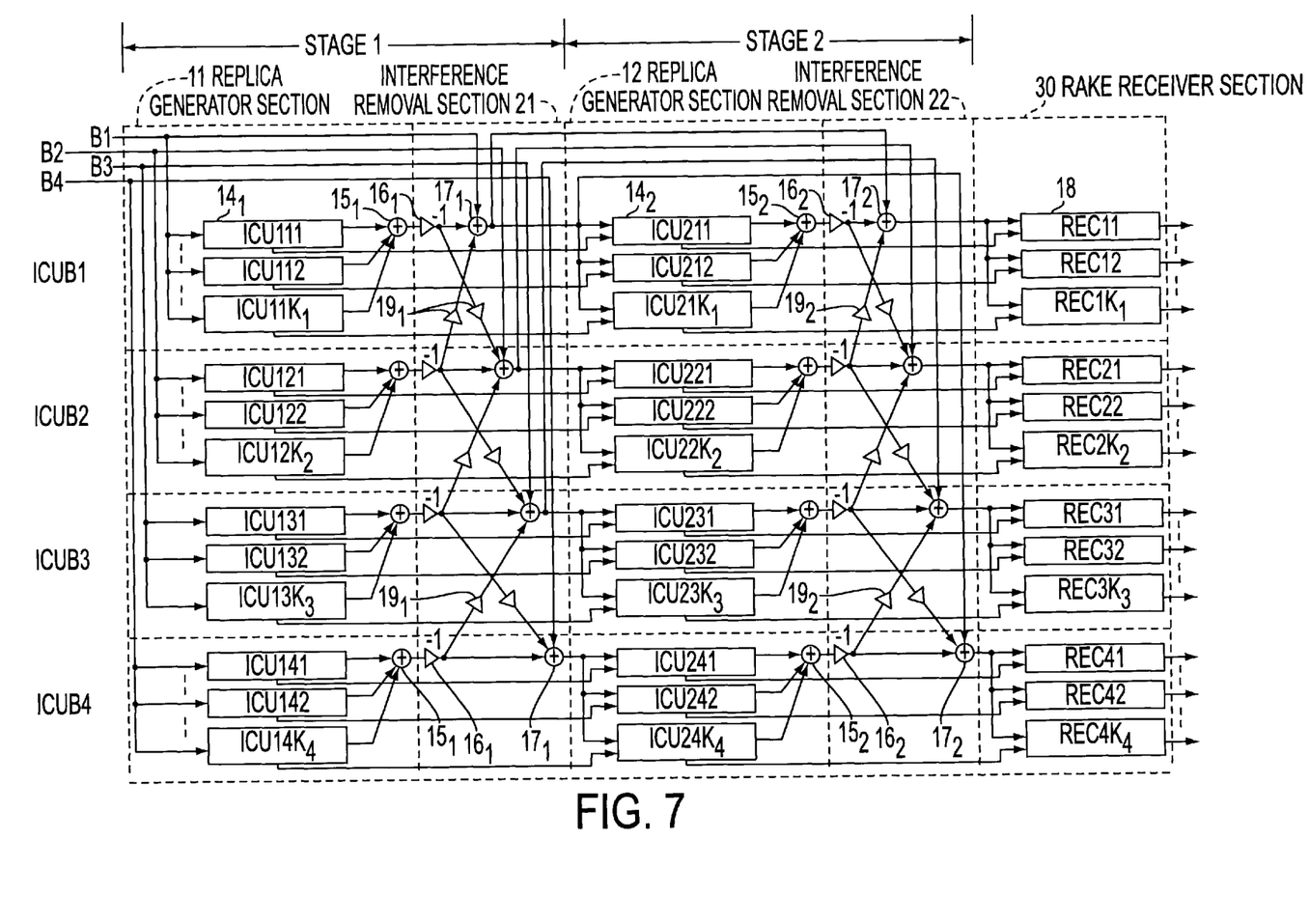
FIG. 7 shows a detailed alternative configuration of the interference canceller and receiver section of the system of FIG. 5.

FIG. 7 shows in detail an alternative configuration of the interference canceller and reception processing section of FIG. 5. Like FIG. 6, FIG. 7 shows a two-stage interference canceller for four beam signals B1 to B4. Sections corresponding to those in FIG. 6 have the same numbers. However, FIG. 7 also shows coefficient multipliers (19₁, 19₂). The configuration shown in this figure only removes interference between adjacent beam signals. The interference replica signal for the local beam signal is multiplied by the conversion coefficients (Gji) and input to the adders (17₁, 17₂) of the interference canceller section for adjacent beam signals. These conversion coefficients (Gji).

The configuration shown in FIG. 7 is arranged in order from beam signal B1 to beam signal B4. Interference canceller section ICUB1 for beam signal B1 inputs an interference replica signal from ICUB2 for adjacent beam signal B2 to the adders (17₁, 17₂) after multiplication by the conversion coefficients (Gji). The added interference replica signal is subtracted from beam signal B1 to eliminate the interference by beam signal B2.

Interference canceller section ICUB2 for beam signal B2 inputs interference replica signals from ICUB1 and ICUB3 for adjacent beam signals B1 and B3 to the adders (17₁, 17₂) after multiplication by the respective conversion coefficients (G₁, ₂ and G₃, ₁). The added interference replica signals are subtracted from beam signal B2 to eliminate interference by beam signals B1 and B3.

Interference canceller section ICUB3 for beam signal B3 inputs interference replica signals from ICUB2 and ICUB4 for adjacent beam signals B2 and B4 to the adders (17₁, 17₂) after multiplication by the respective conversion coefficients (G₂, ₃ and G₄, ₃). The added interference replica signals are subtracted from beam signal B3 to eliminate the interference by beam signals B2 and B4.

Interference canceller section ICUB4 for beam signal B4 inputs an interference replica signal from ICUB3 for adjacent beam signal B3 to the adders (17₁, 17₂) after multiplication by the conversion coefficients (G₃, ₄). The added interference replica signal is subtracted from beam signal B4 to eliminate the interference by beam signal B3.

Since the beam directivity keeps the interference low with the beam signals that are not adjacent, designing a low-side lobe for each beam to eliminate only the interference by adjacent beam signals is usually practical enough. This configuration produces less deterioration of the reception characteristic than the one shown in FIG. 6.

As explained so far with examples, this invention can be applied to mutually equivalent interference cancellers. If the adders (15₁, 15₂) of the replica signal generators (11, 12) are used as the adders for inversion output, the polarity inverters (16₁, 16₂) can be omitted. The interference cancellers can be created easily from digital signal processors using software. The conversion coefficients explained above for a beam former can be calculated through experimentation in actual use.

Since only an interference replica signal transfer mechanism is added, this invention increases the circuit scale only to a negligible extent with almost no cost increase. This invention decreases interferences between beams as well as between users.

What is claimed is:

1. Multistage interference canceller equipment for eliminating interference between user channels for each signal beam by subtracting interference replica signals from input signals, the equipment comprising:

an interference canceller section provided for each of input signal beams in each stage of the equipment and including a replica signal generator and an interference removal section coupled to said replica signal generator, wherein said replica signal generator includes means for generating a first interference replica signal from an input beam signal to produce a first error signal, and said interference removal section receives from another replica signal generator provided for another signal beam a second interference replica signal which is multiplied by conversion coefficients and subtracts an obtained multiplied second interference replica signal from said first interference replica signal outputted from said replica signal generator to eliminate interference by said another signal beam and produce a second error signal and output said second error signal to a replica signal generator of the next stage.

2. Inference canceller equipment according to claim 1, wherein said interference removal section includes means for multiplying by the conversion coefficients the first replica signal and, from among interference replica signals generated by replica signal generators for other beams, the second interference replica signal generated by the replica signal generator for an adjacent beam, and means for subtracting each multiplied signal from the first error signal.

3. Interference canceller equipment according to claim 1, further comprising a beam former and wherein said conversion coefficients correspond to the conversion coefficients for the beams used by the beam former in a preceding stage.

4. Interference canceller equipment comprising:
    a first stage including a first interference canceller section provided for each beam to generate a first error signal and a symbol replica signal from an input multiple beam signal;
    a second stage including a second interference canceller section provided for each first interference canceller to generate a second error signal and a symbol replica signal from the first error signal and the symbol replica signal of the first stage;
    wherein said first interference canceller section includes a first replica signal generator to generate an interference replica signal from an input beam signal, and a first interference removal section to subtract a second interference replica signal receiving a first replica signal generator for another beam signal and multiplied by conversion coefficients, from the first interference replica signal received from said first replica signal generator to produce the first error signal and output the first error signal to a replica signal generator of the next stage,
    wherein said second interference canceller section includes a replica signal generator to generate an interference replica signal from said first error signal outputted from said first stage and a second interference removal section to subtract a second interference replica signal received from the second replica signal generator for another beam signal and multiplied by conversion coefficients, from the first interference replica signal from said second replica signal generator to produce a second error signal and output the second error signal to the replica signal generator of the next stage.

5. Interference canceller equipment according to claim 4, wherein said interference removal section multiplies the interference replica signals from the replica signal generators of the interference canceller sections of the second stage for adjacent beams and subtracts the multiplied signals.

6. Interference canceller equipment according to claim 4, and further comprising a beam former for each stage, and wherein said conversion coefficients correspond to conversion coefficients for beams used by the beam former in a preceding stage.

7. A multibeam interference cancellation method for eliminating interference between channel users by subtracting interference replica signals from an input signal, the method comprising the steps of:
    generating interference replica signals and symbol replica signals from first error signals and symbol replica signals input for each of multiple beams; and
    multiplying an interference replica signal for one of the multiple beams and interference replica signals for other beams by conversion coefficients and subtracting the multiplied interference replica signal from the first error signal to generate a second error signal to input said second error signal to the next stage of multibeam interference cancellation.

8. The method for cancelling interference according to claim 7, wherein said interference replica signals generated for adjacent beams of said other beams are multiplied by the conversion coefficients and subtracted from the first error signal in said multiplying step.

9. The method for cancelling interference according to claim 7, wherein said conversion coefficients correspond to conversion coefficients for beams used by a beam former in a preceding stage of the multibeam interference cancellation.

10. Multistage interference canceller equipment according to claim 1, wherein each replica signal generator in each stage includes a multi-input adder for adding error signals from interference canceller sections corresponding to each channel user.

11. Multistage interference canceller equipment according to claim 10, wherein each interference removal section in each stage includes a polarity inversion unit coupled to said multi-input adder, for inverting a signal polarity of a signal received from said multi-input adder to produce an interference replica signal, and another multi-input adder coupled to said polarity inversion unit to receive interference replica signals from a local signal beam and other signal beams and subtract said interference replica signals from the local beam signal to output an error signal without any interference between channel users and beam signals.

12. Multistage interference canceller equipment according to claim 11, and further comprising a reception processing unit including a receiver section corresponding to each channel user and coupled to the last stage of the equipment, each receiver section receiving error signals from the corresponding another multi-input adder and the symbol replica signals from the corresponding interference canceller section and outputting user symbols by RAKE processing.

13. Multistage interference canceller equipment for eliminating interference between user channels for each signal beam in a multibeam antenna communication system by subtracting interference replica signals from input signals, the equipment comprising:
    a beam former, coupled to a plurality of antennas of the multibeam communication system, for converting signals received by said antennas into signal beams;
    an interference canceller section provided for each of input signal beams in each stage of the equipment and including a replica signal generator and an interference removal section coupled to said replica signal generator, said interference canceller section receiving a corresponding signal beam from said beam former,
    wherein said replica signal generator includes means for generating a first interference replica signal from an input beam signal to produce a first error signal, and said interference removal section receives from another replica signal generator provided for another signal beam a second interference replica signal which is multiplied by conversion coefficients and subtracts an obtained multiplied second interference replica signal from said first interference replica signal outputted from said replica signal generator to eliminate interference by said another signal beam and produce a second error signal and output said second error signal to a replica signal generator of the next stage.

14. Interference canceller equipment for eliminating interference between user channels for each signal beam of a plurality of signal beams by subtracting interference replica signals from input signals, the equipment comprising:

an interference canceller section provided for each input signal beam of said plurality of input signal beams and including a replica signal generator and an interference removal section coupled to said replica signal generator, wherein said replica signal generation includes means for generating a first interference replica signal from an input beam signal to produce a first error signal, and said interference removal section receives from another replica signal generator provided for another signal beam a second interference replica signal which is multiplied by conversion coefficients and subtracts an obtained multiplied second interference replica signal from said first interference replica signal outputted from said replica signal generator to eliminate interference by said another signal beam and produce a second error signal and output said second error signal.

* * * * *